(12) United States Patent
Bressan et al.

(10) Patent No.: US 7,933,454 B2
(45) Date of Patent: Apr. 26, 2011

(54) CLASS-BASED IMAGE ENHANCEMENT SYSTEM

(75) Inventors: Marco Bressan, Grenoble (FR); Christopher R. Dance, Grenoble (FR); Gabriela Csurka, Crolles (FR)

(73) Assignee: Xerox Corporation, Norwalk, CT (US)

( * ) Notice: Subject to any disclaimer, the term of this patent is extended or adjusted under 35 U.S.C. 154(b) by 965 days.

(21) Appl. No.: 11/767,739

(22) Filed: Jun. 25, 2007

(65) Prior Publication Data

US 2008/0317358 A1 Dec. 25, 2008

(51) Int. Cl.
G06K 9/62 (2006.01)
G06K 9/46 (2006.01)

(52) U.S. Cl. ........................ 382/224; 382/254

(58) Field of Classification Search .......... 382/173, 382/180, 224, 228, 229, 254, 305, 312, 190; 358/1.18, 1.9, 2.1, 3.27, 448, 462
See application file for complete search history.

(56) References Cited

U.S. PATENT DOCUMENTS

| | | | |
|---|---|---|---|
| 5,347,374 A | 9/1994 | Fuss et al. | |
| 5,357,352 A | 10/1994 | Eschbach | |
| 5,363,209 A | 11/1994 | Eschbach et al. | |
| 5,371,615 A | 12/1994 | Eschbach | |
| 5,414,538 A | 5/1995 | Eschbach | |
| 5,450,217 A | 9/1995 | Eschbach et al. | |
| 5,450,502 A | 9/1995 | Eschbach et al. | |
| 5,802,214 A | 9/1998 | Eschbach et al. | |
| 6,502,583 B1 | 1/2003 | Utsugi | |
| 6,512,846 B1 | 1/2003 | Luo | |
| 6,571,003 B1 | 5/2003 | Hillebrand et al. | |
| 6,573,932 B1 | 6/2003 | Adams, Jr. et al. | |
| 6,718,051 B1 | 4/2004 | Eschbach | |
| 6,807,313 B1 | 10/2004 | Allen et al. | |
| 6,914,694 B1 | 7/2005 | Ichikawa et al. | |
| 6,977,679 B2 | 12/2005 | Tretter et al. | |
| 7,035,467 B2* | 4/2006 | Nicponski | 382/224 |
| 7,050,636 B2 | 5/2006 | Gallagher et al. | |
| 7,254,285 B1* | 8/2007 | Paek et al. | 382/305 |
| 7,283,656 B2* | 10/2007 | Blake et al. | 382/137 |
| 7,505,178 B2* | 3/2009 | Erol et al. | 358/3.27 |
| 7,711,211 B2* | 5/2010 | Snowdon et al. | 382/305 |
| 2002/0172419 A1 | 11/2002 | Lin et al. | |
| 2003/0044178 A1 | 3/2003 | Oberhardt et al. | |
| 2003/0081842 A1 | 5/2003 | Buckley | |
| 2004/0258308 A1 | 12/2004 | Sadovsky et al. | |
| 2005/0168561 A1 | 8/2005 | Furuki et al. | |
| 2006/0228040 A1 | 10/2006 | Gallagher et al. | |
| 2006/0274950 A1 | 12/2006 | Fan et al. | |
| 2007/0005356 A1 | 1/2007 | Perronnin | |

(Continued)

OTHER PUBLICATIONS

F.Perronnin, C.Dance, G.Csurka, M.Bressan, Adapted Vocabularies for Generic Visual Categorization, *ECCV, Part IV, LNCS 3954*, pp. 464-475, 2006.

(Continued)

*Primary Examiner* — Kanji Patel
(74) *Attorney, Agent, or Firm* — Fay Sharpe LLP

(57) ABSTRACT

A method for image enhancement includes providing for a semantic class to be assigned to a digital image based on image content, the assigned semantic class being selected from a plurality of semantic classes. The method further includes providing for an aesthetic enhancement to be applied to the image based on image quality of the image and the assigned semantic class, the enhancement including at least one enhancement dimension selected from a plurality of enhancement dimensions.

28 Claims, 4 Drawing Sheets

U.S. PATENT DOCUMENTS

2007/0009167 A1  1/2007  Dance et al.

OTHER PUBLICATIONS

G.Csurka, J.Williamowski, C.R.Dance, F.Perronnin, Incorporating Geometry Information with Weak Classifiers for Improved Generic Visual Categorization, *EU Project, LAVA*, (IST-2001-34405).

B.Leibe, A.Leonardis, B.Schiele, Combined Object Categorization and Segmentation with an Implicit a Shape Model, *In Proc. ECCV Workshop on Statistical Learning in Computer Vision*, pp. 17-32, 2004.

G.Csurka, C.Dance, L.Fan, J.Willamowski, C.Bray, Visual Categorization with Bags of Keypoints, *In Proc. ECCV International Workshop on Statistical Learning in Computer Vision*, 2004.

R.Fergus, P.Perona, A.Zisserman, Object Class Recognition by Unsupervised Scale-Invariant Learning, *In Proc. CVPR*, vol. 2, pp. 264-271, 2003.

M.Bressan, C.Dance, R.Poirier, D.Arregui, Local Contrast Enhancement, *In SPIE, Electronic Imaging*, 2007.

J.Sivic, B.C.Russell, A.A.Efros, A.Zisserman, W.T.Freeman, Discovering Objects and Their Location in Images, *MIT AI Lab Memo AIM-2005-005*, Feb. 2005.

U.S. Appl. No. 11/170,496, filed Jun. 30, 2005, Perronnin.
U.S. Appl. No. 11/311,991, filed Dec. 20, 2005, Willamowski, et al.
U.S. Appl. No. 11/418,949, filed May 5, 2006, Perronnin.
U.S. Appl. No. 11/435,545, filed May 17, 2006, Duan, et al.
U.S. Appl. No. 11/435,588, filed May 17, 2006, Duan, et al.
U.S. Appl. No. 11/524,100, filed Sep. 19, 2006, Perronnin.
U.S. Appl. No. 11/524,236, filed Sep. 19, 2006, Dance, et al.
U.S. Appl. No. 11/637,984, filed Dec. 13, 2006, Digby.
U.S. Appl. No. 11/801,230, filed May 9, 2007, Marchesotti, et al.

P.Quelhas, F.Monay, J.M.Odobez, D.Gatica-Perez, T.Tuytelaars, L.Vangool, Modeling Scene with Local Descriptors and Latent Aspects, *In Proc. of the Tenth IEEE ICCV*, vol. 1, pp. 883-890, 2005.

E.B.Sudderth, A.Torralba, W.T.Freeman, A.S.Willsky, Describing Visual Scenes Using Transformed Dirichlet Processes, *Conference of Neural Information Processing Systems*, 2005.

S.Fidler, G.Berginc, A.Leonardis, Hierarchical Statistical Learning of Generic Parts of Object Structure, *In Proc. of the 2006 IEEE Computer Society Conference on CVPR*, vol. 1, pp. 182-189, 2006.

D.J.Crandall, D.P.Huttenlocher, Weakly Supervised Learning of Part-Based Spatial Models for Visual Object Recognition, *ECCV, Part 1, LNCS 3951*, pp. 16-29, 2006.

A.Agrawal, B.Triggs, Hyperfeatures—Multilevel Local Coding for Visual Recognition, *In Proc. of the 9th European Conference on Computer Vision*, 2006.

M.Bressan, G.Csurka, S.Favre, Towards Intent Dependent Image Enhancement: State-of-the-Art and Recent Attempts, *XRCE at 2nd International Conference on Computer Vision Theory and Applications*, Barcelona, Spain, Mar. 8-11, 2007.

\* cited by examiner

CLASS-BASED IMAGE ENHANCEMENT SYSTEM

CROSS REFERENCE TO RELATED PATENTS AND APPLICATIONS

The following copending applications, the disclosures of which are incorporated herein by reference in their entireties, are mentioned:

U.S. application Ser. No. 11/524,100, filed Sep. 19, 2006, entitled BAGS OF VISUAL CONTEXT-DEPENDENT WORDS FOR GENERIC VISUAL CATEGORIZATION, by Florent Perronnin.

U.S. application Ser. No. 11/418,949, filed May 5, 2006, entitled GENERIC VISUAL CLASSIFICATION WITH GRADIENT COMPONENTS-BASED DIMENSIONALITY ENHANCEMENT, by Florent Perronnin.

U.S. patent application Ser. No. 11/170,496, filed Jun. 30, 2005, entitled GENERIC VISUAL CATEGORIZATION METHOD AND SYSTEM, by Florent Perronnin.

U.S. application Ser. No. 11/637,984, filed Dec. 13, 2006, entitled PRINTER WITH IMAGE CATEGORIZATION CAPABILITY, by Anthony Digby.

U.S. application Ser. No. 11/801,230, filed May 9, 2007, entitled PRINT JOB AESTHETICS ENHANCEMENTS DETECTION AND MODELING THROUGH COMBINED USER ACTIVITY ANALYSIS AND CONTENT MATCHING, by Luca Marchesotti, et al.

BACKGROUND

The exemplary embodiment relates to the field of image processing. It finds particular application in connection with the automated enhancement of digital images, and is described with particular reference thereto. However, it is to be appreciated that it may find more general application in image classification, image content analysis, image archiving, image database management and searching, and so forth.

Widespread availability of devices capable of acquiring digital images, such as digital cameras, cell phones, and other direct-digital imagers, and of optical scanners that convert film images, paper-printed images, and the like into digital format, has led to generation of large numbers of digital images. Regardless of the final medium in which the images will be managed, shared and visualized, the quality expectations of users are growing. Consumers are able to integrate their own image content into workflows, such as online photofinishing or content-sharing communities, and are making increasing use of automated or semi-automated image enhancement tools.

Image enhancements are generally applied to obtain a resulting image which is more suitable than the original for a specific objective. Visual quality is a sample objective, but depending on the application, quality might not be the main purpose of enhancement, e.g., in medical imaging.

For example, features such as automatic color balance or red-eye correction are now standard components in many image editing applications. Acquisition conditions, user expertise, compression algorithms and sensor quality can seriously degrade the final image quality. Image enhancement tools attempt to compensate for this degradation by altering image features for subsequent analysis, distribution or display. Examples of these image features include contrast and edge enhancement, noise filtering for a wide variety of noise sources, sharpening, exposure correction, color balance adjustment, automatic cropping, and correction of shaky images.

Some of these features, such as noise filtering, can be objectively defined and others, such as contrast, tend to be subjective and thus influenced by human perception. For example, while some people might prefer to see shadowed details made visible by application of a local contrast approach, others may appreciate the sensation of depth caused by the original shadows. Accordingly, there is an interest in capturing the intent of users in determining which automated image enhancements to apply. To some degree, the intention may vary according to the customer. A photographer wishing to depict a scene may value those enhancement operations that lead to a more faithful representation of the captured scene. A designer or an advertiser may look for image enhancements which are optimal for transmitting a message, e.g., an emotion. A person preparing a photograph of a baby for inclusion in a family album may wish to capture a facial expression, at the cost of leaving degradations untouched or even highlighting them. A photofinishing service generally wishes to automate image enhancements in order to please the largest possible audience.

INCORPORATION BY REFERENCE

U.S. Publication No. 2007/0009167, published Jan. 11, 2007, entitled CONTRAST ENHANCEMENT METHOD, by Dance, et al. discloses a method and system for contrast enhancement of an input image that utilizes luminance values of pixels of the input image to derive transforms. The method down-samples and partitions an image into sub-images whereby transforms are generated for selected sub-images. The selected sub-image transforms are used to generate an output transform which is applied to the input image for local contrast enhancement of the image. In deciding whether the input image is to receive local contrast enhancement, darkness features of the input image are compared to threshold values and combined into an expression which results in the determination.

U.S. Publication No. 2007/0005356, published Jan. 4, 2007, entitled GENERIC VISUAL CATEGORIZATION METHOD AND SYSTEM, by Florent Perronnin discloses techniques for classifying images based on class visual vocabularies constructed by merging a general visual vocabulary with class-specific visual vocabularies.

BRIEF DESCRIPTION

In accordance with one aspect of the exemplary embodiment, a method for image enhancement is provided. The method includes providing for a semantic class to be assigned to a digital image based on image content, the assigned semantic class being selected from a plurality of semantic classes. The method further includes providing for an aesthetic enhancement to be applied to the image based on image quality of the image and the assigned semantic class, the enhancement including at least one enhancement dimension selected from a plurality of enhancement dimensions.

In accordance with another aspect, an image enhancement system includes an image quality component for assigning an image quality to the images, based on image quality parameters of input digital images. An image categorizing component is provided for assigning a semantic class to an input image based on image content. A model maps assigned image quality and assigned semantic class to candidate aesthetic enhancements, whereby for at least some of the input images, the enhancement is applied in a mode which is dependent on the assigned semantic class.

In accordance with another aspect, a method for forming an image enhancement system includes identifying a set of candidate aesthetic enhancement dimensions for applying to digital images based on a measure of image quality. For at least some of the candidate enhancement dimensions, a plurality of discrete modes in which the enhancement dimensions are to be applied is established. The method further includes identifying a set of semantic classes to which digital images are to be assigned by an automated categorizer, based on their image content and mapping the semantic classes and image quality measures to discrete modes of the candidate aesthetic enhancement dimensions.

In another aspect, an image processing system takes as input a digital image and determines a candidate enhancement for the image based on image quality for the image, the image processing system determining whether the image should be assigned to a special effects class and, where the image is assigned to the special effects class, determines that the candidate enhancement is not to be applied.

The images assigned to the special effect class may include one or more of manipulated photographs, images with unusual viewpoints, images with special lighting effects, and artificially created images.

DETAILED DESCRIPTION

Aspects of the exemplary embodiment relate to an apparatus and a method for automated image enhancement. The apparatus classifies an image to be processed according to one or more intent-based classification schemes and, based at least in part on the classification, determines an automated enhancement to be applied to the image.

An advantage of the exemplary embodiment is the ability to improve image enhancement by predicting the intent of a user through mapping the space of intentions with the space of possible image enhancements. It is assumed that the semantic content of images drives intention, at least in part. Thus, for example, it is assumed that users may generally prefer one enhancement for an outdoor scene while preferring a different enhancement for a portrait. By modeling the mapping between semantic content and enhancement operations, therefore, the intent of the users can inform the decision on whether to apply a particular enhancement.

Figure 1:
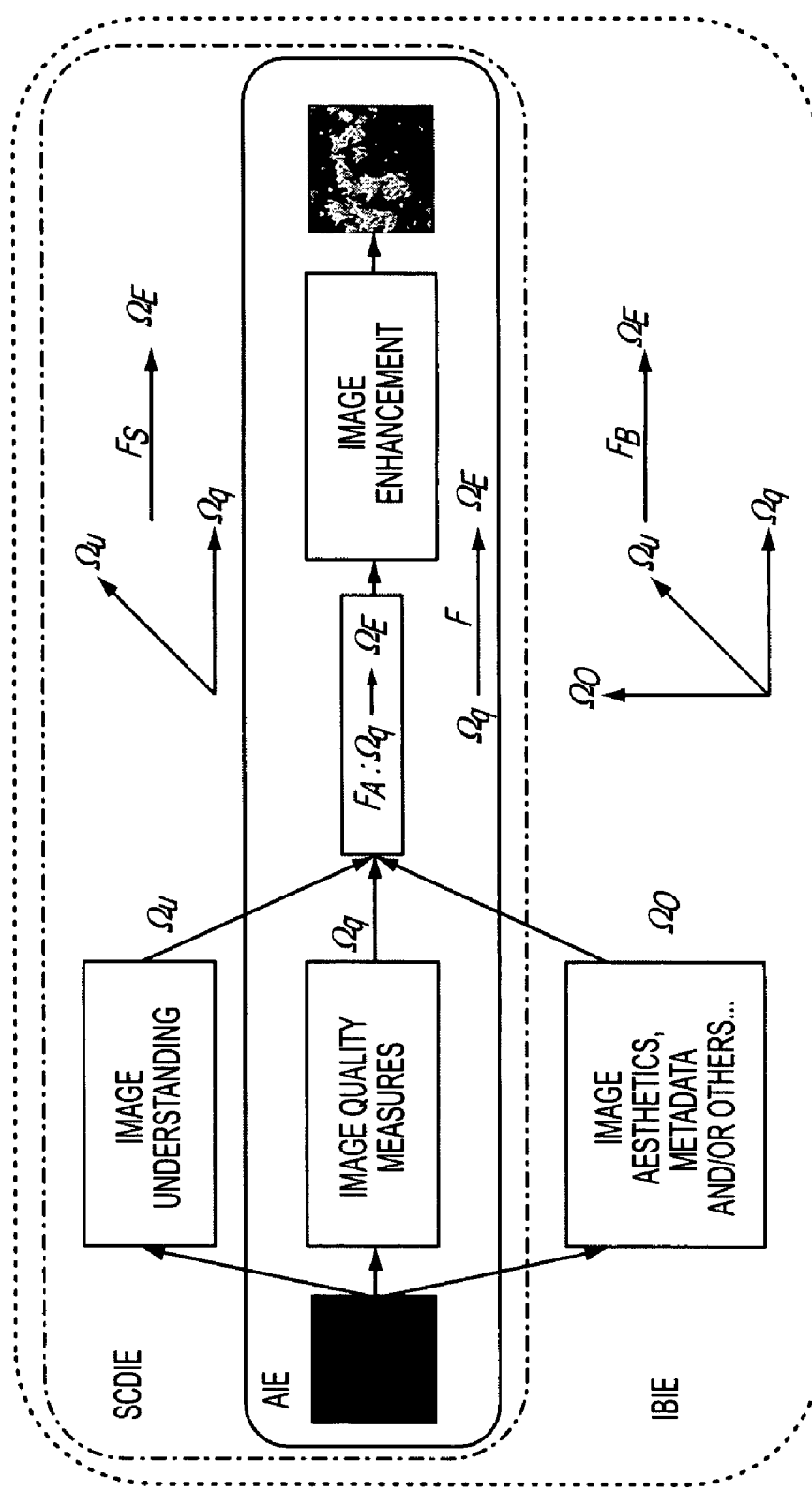
FIG. 1 is a schematic representation of a model for determining aesthetic enhancements for an image based on image class and image quality in accordance with one aspect of the exemplary embodiment.

FIG. 1 schematically illustrates a semantic content dependent image enhancement (SCDIE) model which takes into account semantic content for image enhancement. Conventional automated image enhancement (AIE) is generally based on operations that model low-level image quality measures $\Omega_q$. Thus the model $F_A$ for such systems maps input quality measures to the image enhancement space $\Omega_E$.

SCDIE also considers semantic dimensions $\Omega_u$ and this extension allows for more precise models which can deal with, e.g., an overexposed sunny landscape. In its model $F_S$, SCDIE maps both image quality measures $\Omega_q$ and semantic dimensions $\Omega_u$ to a particular enhancement in enhancement space $\Omega_E$ which is then used to improve image quality. The domain of this mapping of $\Omega_u$ and $\Omega_q$ may be referred to as intent space $\Omega_I$ with the target being the same enhancement space $\Omega_E$ as for AIE, which may be a function of the capabilities of the enhancement system. As will be appreciated from FIG. 1, other dimensions can be naturally incorporated into this model. For example, meta-data associated with the image may be used as a dimension which can be input to the model in an intent-based image enhancement (IBIE) model which incorporates SCDIE.

The mapping between the intent space $\Omega_I$ and enhancement space $\Omega_E$ may be learnt from user evaluations, particularly when the purpose is subjective quality, as measured by user preference. This may be achieved by introducing a discretization of both semantic content $\Omega_u$ and enhancement spaces $\Omega_E$ and optionally also by introducing a measure of coherence, agreement, and relevance in evaluating the user responses. In another aspect, the method provides a binary decision of whether or not to enhance an image, such as in the case of special effects images. One way to obtain data for the mapping is through a review of shared content, where multiple users express their preferences online. Another way is to conduct a survey in which users express their preferences for enhancements.

With regard to the discretization of the semantic content space $\Omega_q$, a set of discrete classes $S_1, S_2, S_3 \ldots S_M$ may be defined. As will be appreciated, the number and type of discrete semantic classes which may be employed in the mapping is virtually unlimited. For example, semantic classes such as automobiles, faces, people, seascapes, landscapes, flowers, buildings (urban), or subsets of these classes may be selected. To some degree, the number of classes which may be usefully employed is a function of the amount of user preference data available. In one embodiment, there are at least three or at least four defined, discrete semantic classes into which images can be classified. Semantic classes $S_1, S_2, S_3 \ldots S_M$ may be determined on the basis of the entire image or on localized regions thereof. The assignment to a semantic class can be a binary (yes or no) decision. Alternatively, the decision may be on a continuous scale with a confidence value being associated with the assignment. The confidence value may represent the confidence with which the assignment is made and can be estimated using distance values, probabilities, likelihoods, or other confidence scoring methods.

Regarding the enhancement space $\Omega_E$, a set of discrete enhancement operations (dimensions) $E_1, E_2, E_3 \ldots E_N$ may be defined. The set of enhancement operations $E_1, E_2, E_3 \ldots E_N$ may be a function of the enhancement tools available. Exemplary enhancement operations include contrast and edge enhancement, noise filtering, sharpening, exposure correction, color balance adjustment, automatic cropping, and correction of shaky images. For mapping purposes, each of the enhancement operations is allowed to assume one of a plurality of discrete states or "modes", such as low (or no correction) L, default D, and high H, which influence how much correction is to be applied. Thus for example, in the case of a photograph which is blurred and has low contrast, an enhancement may include contrast enhancement and sharpening, the extent to which each of these operations are applied being a function of the class to which the image is assigned. Thus, for example, the mapping of an image classed in $S_1$ may be $E_1H, E_2D$ while the same image classed in $S_2$ may be $E_1D$, $E_2L$. The mapping may also take into account the confidence value associated with the assignment of the image to a particular semantic class. Thus, for example, an image classed as $S_1$ with an 80% confidence value may receive a greater correction for $E_1$ than if the same image were to be classed in $S_1$ with only a 60% confidence level.

Image quality may be expressed as parameters of discrete or interrelated dimensions $Q_1, Q_2, Q_3 \ldots Q_P$, such as such as luminance and chrominance distributions and statistics, noise, edge levels, blocking artifacts, and the like, overall parameters derived from these dimensions, or as a function of these parameters Having defined the semantic classes $S_1, S_2, S_3 \ldots S_M$ and enhancement space $\Omega_E$, the mapping can be learnt from user preference evaluations. A model based on the mapping can be used to determine automated image enhancement operations for new images, based at least in part on their semantic categorization. In the exemplary embodiment, images to be processed using the model are automatically classified into one (or more) of a set of predefined image content classes $S_1, S_2, S_3 \ldots S_M$. Image enhancements based on the categorization are then developed using the model. These enhancements may then be applied to the image.

Figure 2:
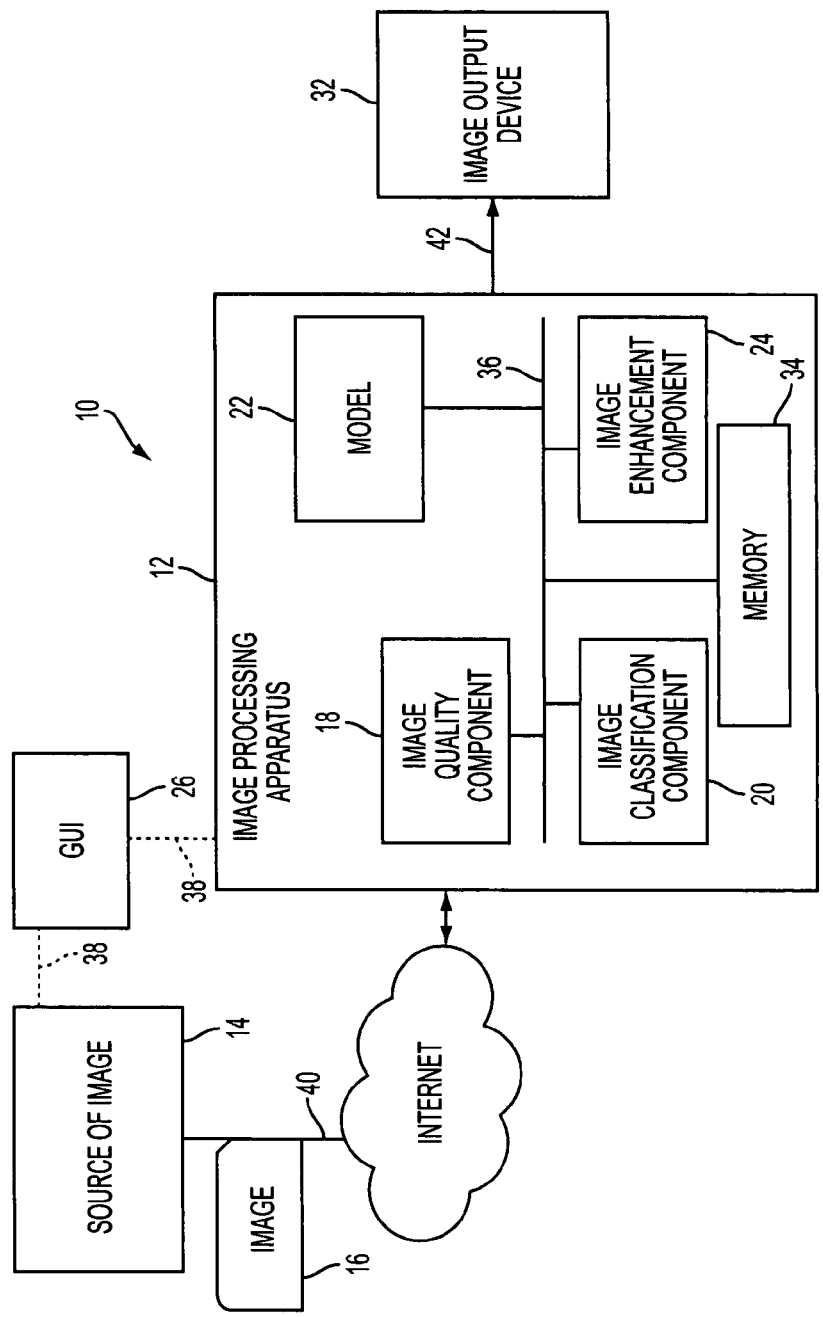
FIG. 2 illustrates a system for processing images which incorporates the model of claim 1, in accordance with another aspect of the exemplary embodiment.

With reference to FIG. 2, an exemplary system 10 for automatic image enhancement in accordance with stored algorithms and/or based on user-selected functions is shown.

The system 10 includes an image processing component (IPC) 12 which may be hosted by a computing device, such as a general purpose computing device, e.g., a workstation, laptop, PDA, or the like, or by a dedicated device with computing capability, such as a digital camera, printer, or the like, or may be resident on a server. A source of images 14 supplies digital images 16 to the IPC for processing. The IPC 12 executes processing instructions for receiving images 16, processing the images based on semantic classification and image quality, and outputting the processed images in accordance with the exemplary methods described herein. In particular, the IPC 12 includes an image quality component (IQC) 18 for analyzing image quality of a digital image 16 being processed by the IPC 12 and assigning image-quality related measures to the image. The IPC further includes an image categorizing component (ICC) 20 which classifies the image into one or more semantic classes and assigns one or more semantic labels to the image representative of the semantic class(es) $S_1, S_2, S_3 \ldots S_M$. A data structure 22 stores a model $F_S$ which maps parameters of image quality related dimensions $Q_1, Q_2, Q_3 \ldots Q_P$ and semantic labels to possible enhancements. An image enhancement component (IEC) 24 accesses the data structure to determine a proposed enhancement based on the semantic labels and image quality assigned to the image. The proposed enhancement may include selected ones of the enhancement dimensions $E_1, E_2, E_3 \ldots E_N$ and a respective associated mode L, D or H for each selected dimension. The IEC 24 applies the proposed enhancement to the image 16 to generate a modified image.

As will be appreciated, while the operations $E_1, E_2, E_3 \ldots E_N$ performed on the image 16 are described as enhancements, they may not always be considered as such by a user. In one embodiment, the IPC 12 proposes the enhancement to a user e.g., by causing the modified image to be displayed on a user interface, such as a graphical user interface (GUI) 26. The GUI may include a visual display, such as an LCD screen, and a user input device, such as a keyboard, touch screen, cursor control device or combination thereof, for allowing a user to accept or reject the modification. In some embodiments, the user may additionally select further modifications or request that the original image be output.

Digital images 16 are generally photographic images or images derived therefrom. The methods are particularly applicable to images of natural scenes, such as indoor and outdoor scenes and pictures of people. The images to be processed by the IPC can be in any selected format, such as JPEG, GIF, BMP, TIFF, or the like. If appropriate, an image format converter (not shown) can be used to convert the input images to a suitable format for processing. The images can be black-and-white images, color images, or some combination thereof, and can have any suitable resolutions (for example, measured in pixels-per-inch).

The source 14 of images may be a computing device, such as a workstation, a server, a memory storage device, camera, mobile phone, or the like suitable for storing and optionally capturing digital images.

The illustrated IPC 12 communicates with an output device 32. The output device 32 may render the modified image in tangible form. For example, the output device 32 may comprise a printer which renders the modified image on a suitable print media substrate using one or more colorants, such as inks or toners. As used herein, a printer can include any device for rendering an image on print media. In rendering an image, the printer applies colorants, such as inks or toners, to the print media. The printer 32 may employ xerographic printing technology, inkjet printing technology, or the like. The print media can be a physical sheet of paper, plastic, or other suitable physical print media substrate for images.

In another embodiment, the output device may render the modified image in electronic form, e.g., on a display screen. In other embodiments, the modified image may be stored and/or sent another to processing component of the IPC 12 or to another processing device for further processing.

The system 10 further includes memory 34, accessible to the IPC 12 or integral therewith, which may store instructions for the processing components 18, 20, 24. Memory 34 may also store images during processing by the IPC 12. Memory 34 may comprise any known type of data storage and/or transmission media, including magnetic media, optical media, random access memory (RAM), read-only memory (ROM), a data cache, a data object, etc. Moreover, memory 34 may reside at a single physical location, comprising one or more types of data storage, or be distributed across a plurality of physical systems in various forms. The various processing components of the IPC may be operatively connected by a data/control bus 36.

While the IPC 12 is illustrated for convenience as comprising a plurality of processing components 18, 20, 24, two or more of the components may be combined or a component may be split into additional components. Further, the IPC 12 may comprise a single processing unit, or be distributed across one or more processing units in one or more locations, e.g., on a client and server. The IPC may be in the form of software, hardware, or both. In one embodiment the images 16 may be uploaded from a personal computer 14 or other data storage device to a website, such as a photofinishing service website, which operates on or communicates with the IPC 12. In another embodiment, the IPC is in the form of an add-on software component. In another embodiment, the IPC is resident in the computer of printer 32, generally referred to as a Digital Front End.

The IPC 12, source of images 14, GUI 26, and output device 32 may be linked together by suitable links 38, 40, 42, such as wired or wireless links, e.g., via a local area network (LAN), (WAN), or the Internet.

Figure 3:
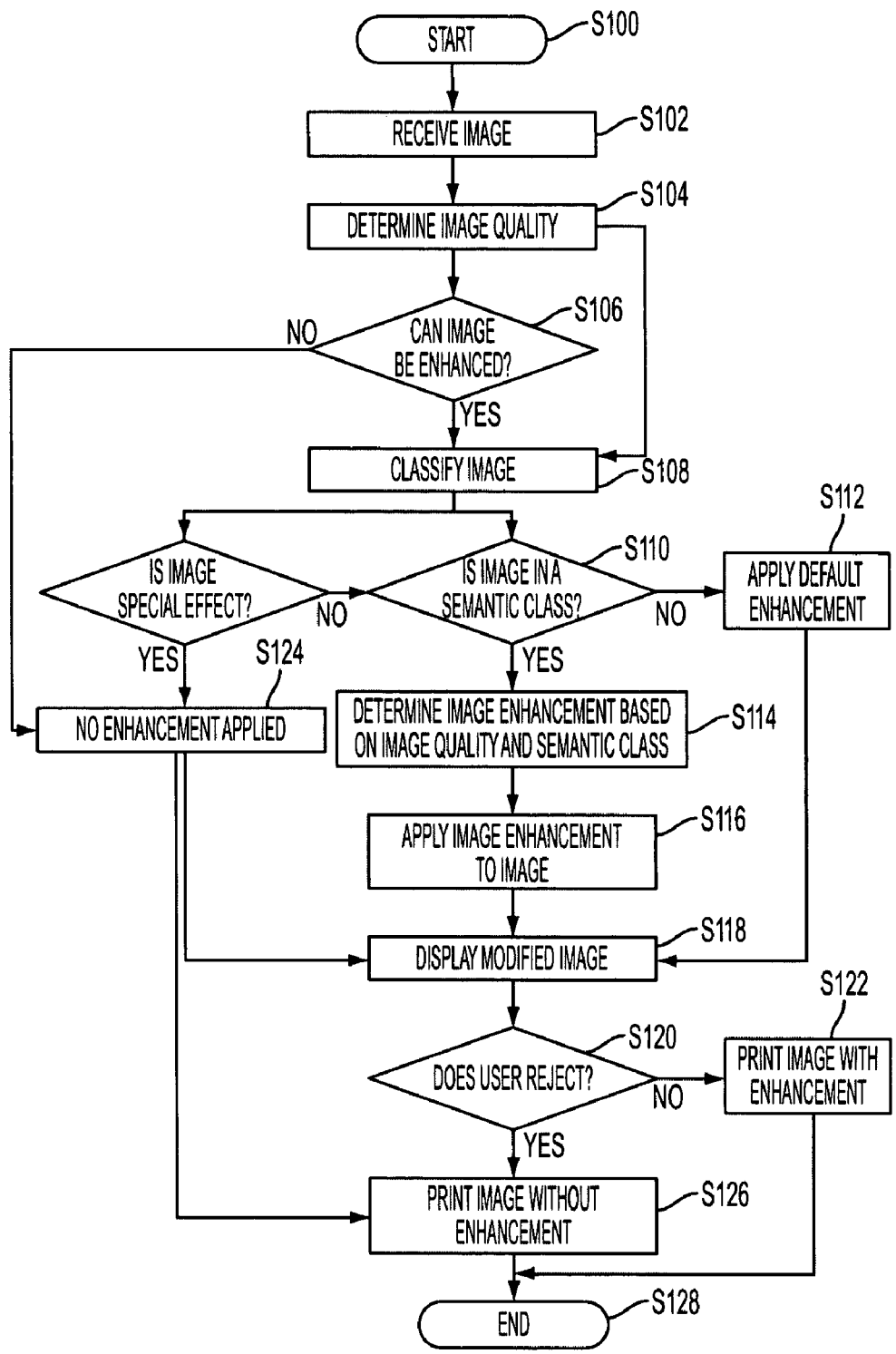
FIG. 3 illustrates a method for processing images in accordance with another aspect of the exemplary embodiment.

With reference now to FIG. 3, an exemplary method for image enhancement is shown. The method starts at S100. At S102, an image is received. At S104, the image quality of the image may be determined. Optionally, at S106 a determination is made as to whether the image may be enhanced. Alternatively, this step may be omitted or incorporated into S114. At S108, the image may be classified and may be assigned to one or more of the semantic classes $S_1, S_2, S_3 \ldots S_M$. Tags may be applied to the image which represent the assigned classes. If at S108, the image is determined to include special effects (class $S=S_{SE}$), the following steps (S110-S114) may be omitted. If the image does not fit into one of the semantic classes, it may be optionally be assigned to a default class $S_D$ which receives a standard correction which is based only on the determined image quality (S112). Alternatively, this step is incorporated into S114, by including a decision for images not specifically assigned to one of the semantic classes or by providing an "other" class. In yet other embodiments, all images are assigned to the semantic class which most closely fits the image.

At S114, a candidate image enhancement is determined, based at least in part on the determined image quality and assigned semantic class (classes). At S116 the candidate enhancement is applied to the image to form a modified image. At S118, the modified image may be displayed. At S120, the user may be provided with an opportunity to reject or accept the modified image with the automatically selected candidate enhancement. Steps S118 and S120 may be omitted in a fully automated system. At S122, the modified image may be rendered on print media, stored, or further processed. For special effects images and images for which no enhancement is generated, the original image may be retained (S124), and at S126, may be printed without modification. The method ends at S128. As will be appreciated the steps of the method need not proceed in the order outlined above and may include fewer, more, or different steps.

Various aspects of the system and method thus described will now be discussed with reference to exemplary embodiments thereof.

Image Quality Determination

In determining the image quality (S104), parameters for one or more image quality dimensions $Q_1, Q_2, Q_3 \ldots Q_P$ may be determined. For example, the IQC 18 may analyze low-level features related with quality in the image, such as luminance and chrominance distributions and statistics, noise, edge levels, blocking artifacts, and the like and generate image quality related parameters which are representative thereof. The image quality parameters may be determined globally, for the entire image, or locally.

Techniques for determining these features are described, for example, in U.S. Pat. Nos. 5,357,352, 5,363,209, 5,371,615, 5,414,538, 5,450,217; 5,450,502, 5,802,214 to Eschbach, et al., U.S. Pat. No. 5,347,374 to Fuss, et al., and U.S. Pub. No. 2003/0081842 to Buckley, the disclosures of which are hereby expressly incorporated by reference herein, and may include generating statistics such as noise measures or luminance and chrominance distributions on a low resolution version of the image. U.S. Pat. No. 5,414,538, for example discloses receiving the input image defined in terms of red-green-blue (RGB) signals, converting the RGB signals to corresponding luminance-chrominance signals including at least one signal that represent overall image intensity, and comparing the intensity signal to upper and lower intensity threshold signals that define the acceptable levels of brightness and darkness in the image. At the decision stage, if one of the thresholds is exceeded, the image signal representative of image intensity is processed according to a select equation, and a TRC associated with the image is adjusted so that exposure characteristics of the resulting output image are perceived to be superior to those of the input image. Similar techniques for luminance are described in U.S. Pat. No. 5,450,502.

In some embodiments, one or more image quality parameters are input to the system 10 with the image, for example, as meta data.

Categorization

The ICC 20 categorizes the image into one or more of a set of semantic classes $S_1, S_2, S_3 \ldots S_M$ and assigns one or more semantic labels to an image (S108). In the exemplary embodiment, it is assumed that image quality and categorization are independent: i.e., image class labels do not depend on quality. In other embodiments, image quality may be considered in assigning classes. Categorization (or image understanding) may encompass a set of operations that transforms pictorial inputs into commonly understood descriptions. Automated techniques have been developed which assign keywords to an image based on its high-level content. These techniques can analyze the whole scene or focus on objects within the image. Keyword assignment may be associated with a confidence value. The image is then labeled with keywords for which the confidence value exceeds a threshold confidence value. The most common tasks are recognition, classification, or detection. Recognition concerns the identification of particular object instances. Object and scene classifications are the tasks of assigning one or more general tags to an image. Detection is the problem of determining if one or more instances of an object occur in an image and, typically, estimate locations and scales of the detected instances.

In some multi-class categorization systems, statistical models are used to learn a sort of dictionary between individual image blobs (segments) and a set of predefined keywords.

In one embodiment, the classification includes a bag of visual word (BOV) based approach. In this approach, the image 16 is characterized by a histogram of visual word counts. The visual vocabulary is built automatically from a training set of images. To do this, some image descriptors are extracted from the image. Those descriptors are generally based on texture, color, shape, structure, or their combination and are extracted locally on regions of interest (ROI). The ROI can be obtained by image segmentation, by applying specific interest point detectors, by considering a regular grid, or by or simply random sampling of image patches. For example, Scale Invariant Feature Transform (SIFT) descriptors may be computed on each region.

For examples of each of these approaches, see, e.g., Csurka, G., Dance, C., Fan, L., Willamowski, J., and Bray, C., "Visual Categorization with Bags of Key-points," in *ECCV Workshop on Statistical Learning for Computer Vision* (2004) (hereinafter, Csurka 2004); Quelhas, P., Monay, F., Odobez, J.-M., Gatica-Perez, D., Tuytelaars, T., and Gool, L. V., "Modeling Scenes with Local Descriptors and Latent Aspects," in *ICCV* (2005) (hereinafter Quelhas 2005), and Carbonetto, P., de Freitas, N., and Barnard, K., "A Statistical Model for General Contextual Object Recognition," in *ECCV* (2004) (hereinafter Carbonetto 2004).

All features extracted are then mapped to the feature space and clustered to obtain the visual vocabulary. Often a simple K-means is used, however Gaussian Mixture Models (GMMs) (see, Perronnin, F., Dance, C., Csurka, G., and Bressan, M., "Adapted Vocabularies for Generic Visual Categorization," in *European Conf. on Computer Vision*. (2006)) can also be used to obtain a soft clustering, in-line with the continuous nature of visual words.

Given a new image to be classified, each feature vector is assigned to its closest visual word in the previously trained vocabulary or to all visual words in a probabilistic manner in the case of a stochastic model. The histogram is computed by accumulating the occurrences of each visual word. Finally, the histogram is fed to a set of classifiers, for example K nearest neighbor, probabilistic latent semantic classifiers (see, Bosch, A., Zisserman, A., and Munoz, X., "Scene Classification via pLSA." in *ECCV* (2007); Quelhas, P., Monay, F., Odobez, J.-M., Gatica-Perez, D., Tuytelaars, T., and Gool, L. V., "Modeling Scenes with Local Descriptors and Latent Aspects," in *ICCV* (2005)) or support vector machines (see, Csurka 2004), which outputs an overall class label for the image or several class labels for the image.

The exemplary ICC 20 may include a bag of visual words (BOV)-based multi-label categorizer of the type described above, which has been trained on a large group of representative images (training images) that have been manually assigned to one (or more) of a set of classes by an observer. For example, classes may include Urban, Portrait, Flowers, Interiors, Landscape, Snow, and Sky. These classes tend to be representative of images found in typical imaging scenarios, although other classes may be selected or fewer or more classes used. Additionally, one or more of the classes may be a "special effects" class. Enhancements to images classified in the special effects class may differ from those assigned to other classes since conventional enhancements tend not comport with the intention of the photographer. In one embodiment, when an image is classified as "special effects" it does not receive any enhancements.

In the exemplary embodiment, the training images are used to generate a visual vocabulary of visual words. In particular, a features extractor extracts a features vector or other features-based representation of each key patch or other identified region in the image. Low level image features that are extracted are typically quantitative values that summarize or characterize aspects of the region, such as spatial frequency content, an average intensity, color characteristics (in the case of color training images), and/or other characteristic values. A general visual vocabulary generator processes the feature vectors to derive a general visual vocabulary therefrom. A suitable general visual vocabulary can be estimated by clustering the feature vectors into a number of classes corresponding to the number of visual words to be included in the general visual vocabulary. In one embodiment, a high level feature extractor may transform a set of local low-level features into a high level representation comprising one (or more) global high-level feature(s) which characterizes the content of the image as a whole. Above-mentioned application Ser. No. 11/524,100 to Perronnin, et al. for example, discloses other details of exemplary categorizers of this type which may be used.

Patches within the training images are clustered automatically to obtain a vocabulary of visual words, e.g., using K-means clustering. In other approaches, a probabilistic framework is employed and it is assumed that there exists an underlying generative model such as a GMM. In this case, the visual vocabulary is estimated using the Expectation-Maximization (EM) algorithm. In either case, each visual word corresponds to a grouping of low-level features. In one approach, an image can be characterized by the number of occurrences of each visual word. This high-level histogram representation is obtained by assigning each low-level feature vector to one visual word or to multiple visual words in a probabilistic manner. In other approaches, an image can be characterized by a gradient representation in accordance with the above-mentioned application Ser. No. 11/418,949, incorporated herein by reference.

Though most of the mentioned approaches use a single visual vocabulary generally built on the whole training set, in other embodiments, performance may be improved by adapting the visual vocabulary (universal) trained on the whole training set to each class using class-specific images. An image is then characterized by a set of bipartite histograms, one per class, where each histogram describes whether the image content is best modeled by the universal vocabulary, or the corresponding class vocabulary. Such a method is described in application Ser. No. 11/170,496 to Perronnin, incorporated herein by reference.

As will be appreciated other methods of automated categorization may be employed, singly or in combination. For example, a BOV-based categorizer may be combined with selected weak classifiers, as described, for example, in Carbonetto 2004. Other categorizing techniques which may be used are described in Sudderth, E., Torralba, A., Freeman, W., and Willsky, A., "Learning Hierarchical Models of Scenes, Objects, and Parts," in *ICCV* (2006); Fidler, S., Berginc, G., and Leonardis, A., "Hierarchical Statistical Learning of Generic Parts of Object Structure," in *CVPR* (2006); Sivic, J., Russell, B., Efros, A., Zisserman, A., and Freeman, W. "Discovering Objects and their Locations in Images," in *ICCV* (2005); Fergus, R., Perona, P., and Zisserman, A., "Object Class Recognition by Unsupervised Scale-Invariant Learning," in *CVPR* (2003); Leibe, B., Leonardis, A., and Schiele, B., "Combined Object Categorization and Segmentation with An implicit Shape Model," in *ECCV Workshop on Statistical Learning for Computer Vision* (2004); Crandall, D. and Huttenlocher, D., "Weakly Supervised Learning of Part-based Spatial Models for Visual Object Recognition," in *ECCV* (2006); and Csurka, G., Willamowski, J., Dance, C., and Perronnin, F., "Incorporating Geometry Information with Weak Classifiers for Improved Generic Visual Categorization," in *Int. Conf. on Image Analysis and Processing* (2005).

The Model

The model $F_S$ for intent-based enhancement, takes as input the classification of the image, as assigned by the categorizer 20, and the image quality parameters, as determined by the IQC 18, and outputs a candidate image enhancement (S114). The exemplary model $F_S$ may utilize features of Xerox's Automatic Image Enhancement (XAIE) system, which is described in the above-mentioned patents to Eschbach and Fuss and in Bressan, M., Dance, C. R., Poirier, H., and Arregui, D., "LCE: (Automatic) Local Contrast Enhancement," in *SPIE, Electronic Imaging* (2007). The XAIE system is configured as a completely automatic system which includes a set of enhancements.

The model $F_S$, however, maps not only image quality dimensions $Q_1, Q_2, Q_3 \ldots Q_P$ but also categorization dimensions $S_1, S_2, S_3 \ldots S_M$ to a candidate enhancement. This may be an overall mapping or a two stage mapping. For example, in a two stage mapping, given a determined image quality, the model determines whether image enhancement may be applied in a first step and, based on the image's assigned class, the extent (mode) of the enhancement in a second step. As discussed in further detail below, the decision mechanism applied by the model $F_S$ is based on user preferences.

Development of the Model

In the exemplary intent-based enhancement system, development of the model $F_S$ includes estimating a function that maps an image and an intention (as represented by its classification tags) to an enhancement. In one embodiment, a single label is considered per image, e.g., "indoors." The space of intents can then be modeled with a single discrete dimension $S_1, S_2, S_3 \ldots S_M$ which corresponds to the classes. Dimensionality increases, however, if the model is expanded to consider multiple classes per image, locality constraints, additional information such as meta-data, and the like.

In the exemplary embodiment, for the space of possible enhancements $\Omega_E$, a set of enhancement dimensions $E_1, E_2, E_3 \ldots E_N$ is defined. Each of the enhancement dimensions is assigned a finite set of discrete enhancement modes, such as two, three, or more discrete levels. At each of the levels, the rules for applying the particular enhancement differ. For example, in one embodiment, seven enhancement dimensions may be employed: contrast, exposure, shadow details, saturation, color balance, noise reduction, and sharpness which may each have three intensity levels or modes: such as low L, default D, and high H. Depending on the enhancement, the three modes can have a different interpretation, e.g., L=dark, D=default, and H=light for exposure correction. With this approach, the discretization of $\Omega_E$ yields $3^7=2187$ possible modes.

In one embodiment, the determined image quality $\Omega_q$ is used to determine which of the enhancement dimensions $E_1, E_2, E_3 \ldots E_N$ to apply. In the decision mechanism, the mapping provided by the model allows semantic classes $S_1, S_2, S_3 \ldots S_M$ (assuming independence between quality and meaning) to be linked to enhancement modes L, D, H (semantic decision) provided that the decision mechanism decides to apply the enhancement (quality decision). The mapping between classes and enhancements may be learned through user evaluations.

In practice, choosing the preferred enhancement can be difficult, even when $\Omega_E$ is discretized. In one embodiment, the space of possible enhancements may be restricted by assuming independence between enhancements and by screening out improbable mappings through user evaluations. As a result, the number of candidate enhancements, each comprising one or more enhancement dimension(s) and a respective mode, for each class may be reduced to less than twenty, e.g., about ten or less. Examples of enhancements excluded following the screening process may include high saturation on portraits or a high level of sharpness to sky images.

To analyze whether the model should provide a given enhancement mode L, D, or H for a given class $S_1, S_2, S_3 \ldots$ or $S_M$, the following criteria may be considered:

1. Agreement: This measures either positive or negative agreements among different user test participants on given image:

$$\frac{1}{N^I} \sum_{i=1}^{N^I} \left( g\left(\frac{N_b^i + N_n^i/2}{N^U}\right) + g\left(\frac{N_w^i + N_n^i/2}{N^U}\right) \right) \quad \text{(Eqn. 1)}$$

where $g(x)=x \log_2(x)$, $N^U$ is the number of users, $N^I$ is the number of different image considered, and $N_b^i$, $N_w^i$, and $N_n^i$ are the number of users that chose the enhancement as being the best, the worst, or none of them for a given image i. Agreement thus measures the entropy of the distribution of preferences for all users for a single image.

2. Coherence: This measures uniformity of opinion across all images of a single class for any given participant:

$$\frac{1}{N^U} \sum_{u=1}^{N^U} \left( g\left(\frac{N_b^u + N_n^u/2}{N^I}\right) + g\left(\frac{N_w^u + N_n^u/2}{N^I}\right) \right) \quad \text{(Eqn. 2)}$$

where $N_b^u$, $N_w^u$, and $N_n^u$ are the numbers of images for which the user u considered the enhancement as being the best, the worst, or none of them, respectively. Coherence thus measures the entropy of the distribution of the preference of a single user across all images.

3. Relevance: This is the percentage of times the enhancement was chosen as either the best or the worst.

Figure 4:
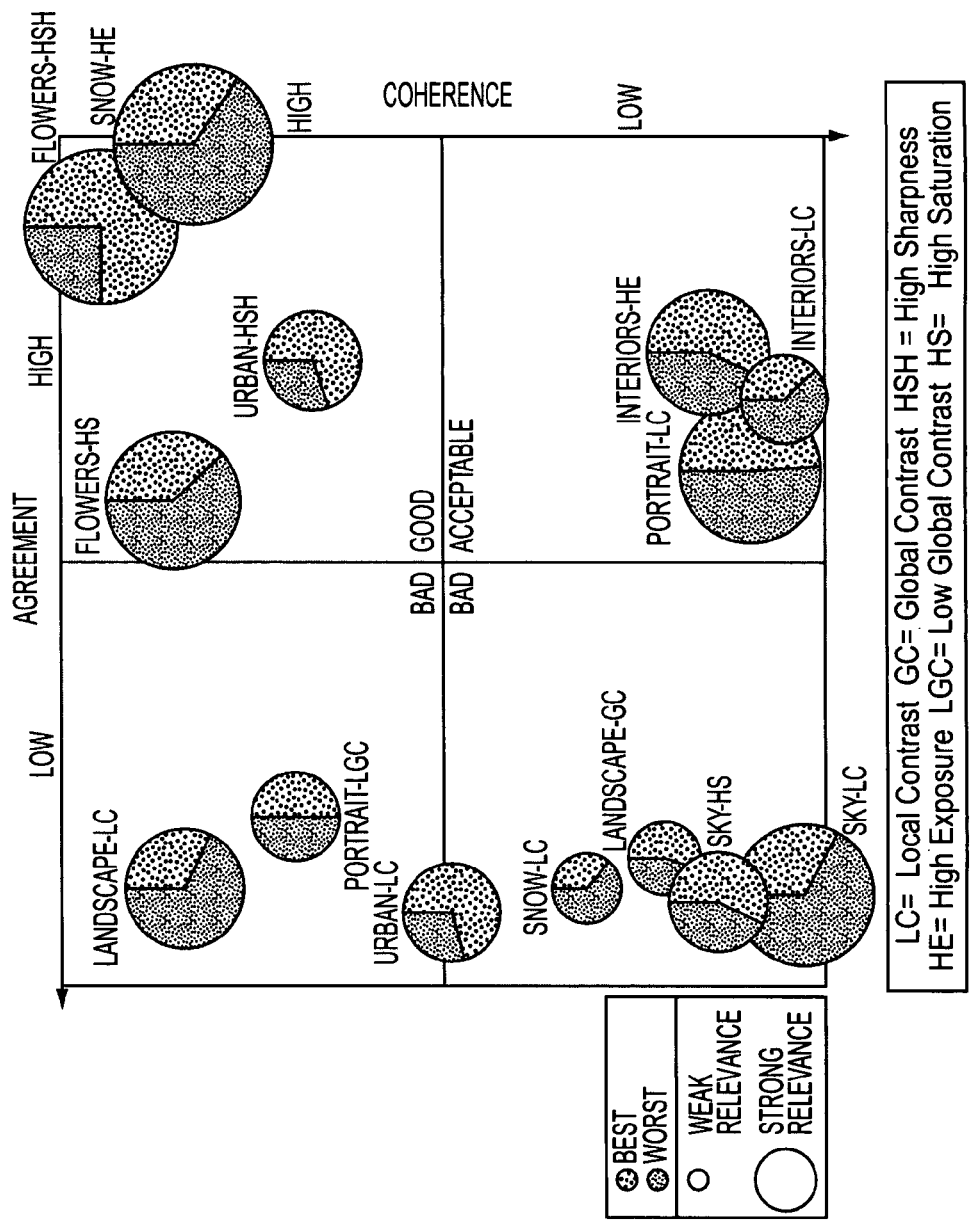
FIG. 4 illustrates agreement and coherence rates for (class, enhancement) pairs for an exemplary set of images.

In one embodiment, enhancement modes of a given enhancement dimension are retained in the model for a given class where there is both at least a threshold level of agreement and at least a threshold level of coherence that the enhancement mode is preferred by observers, and in particular, when there is at least a threshold level of relevance. By way of example, as illustrated in FIG. 4, pairs of (class, enhancement) for an exemplary set of images are plotted as an agreement/coherence map. In generating the data for FIG. 4, a representative set of images was printed from each of seven classes (Urban, Portrait, Flowers, Interiors, Landscape, Snow, and Sky), and for each set of images, all possible enhancement dimensions (saturation, contrast, exposure, sharpness, color balance, -local contrast (LCE) and modes (e.g., low, default, high) were printed for a given image on a single A3-sized page. Participants were asked to choose, for each image, the worst and best enhancement.

Given an (image class, enhancement) pair, e.g., (flower, high saturation): Agreement among different users, given an image, is measured by the entropy $g(x)=x \log_2(x)$ of the distribution of positive or negative preferences. The positive and the negative preference distributions were computed as follows: First, for each image i of the class, the number of participants who considered that the given enhancement was the best $N_b^i$ and the number of users $N_w^i$ who considered that the enhancement was worst were counted. Since there were more than two enhancements for all images, the number of participants who considered it neither best nor worst:

$$N_n^i = N^U - N_b^i - N_w^i.$$

Those participants who considered the image neither best nor worst were distributed equally between positive and negative preferences. The distribution may be normalized by dividing each component by $N^U$, the number of participants who ranked the image (particularly if not all images were ranked by the same number of participants). Finally the mean of entropies is considered over all images of the class, as shown in Eqn. 1.

The coherence can be obtained similarly by exchanging users with images. In this case, it is the entropy $(g(x)=x \log_2(x))$ of the distribution of positive or negative preferences of a user given a set of images that is sought. Then, for each user u the number of images considered best/worst with the given enhancement $N_b^u$ or $N_w^u$, respectively, is computed. Then:

$$N_n^u = N^I - N_b^u - N_w^u,$$

the number of images of the class where the enhancement was considered neither best nor worst by the participants. Those images were distributed equally between positive and negative preferences. The distribution may be normalized by dividing each component by the number of images ($N^I$) of the class (particularly if not all participants ranked the same number of images). Finally, the mean of entropies over all participants is considered, as shown in Eqn. 2.

In FIG. 4, for each (image class, enhancement) pair, the percentages of participants who ranked images as preferred or as having a bad effect are shown by respective shading on a pie chart. The size of the circle is proportional to the relevance. From the exemplary agreement/coherence map, that portion of the map where there is both high agreement and high coherence (upper right) indicates a good candidate for enhancement, indicating that everyone agrees and opinion is consistent for all images in the class. The combination of low agreement and high coherence is considered a weaker candidate for enhancement, because it indicates that the appreciation of the enhancement is highly subjective and dependent on user preference for the respective classes. The combination of high agreement with low coherence is considered to be neutral. This may indicate that the image set for that class was poorly chosen. The combination of low agreement with low coherence is considered a poor candidate for enhancement.

The independence assumption reduces the image comparisons to 3*7=21, in the above example, and the screening eliminates about two-thirds of these possibilities. In the exemplary embodiment, no class had more than six candidate enhancement modes after the screening.

Based on this evaluation, class specific enhancement modes (e.g., high or low) would be suggested for three out of the eight selected classes: flowers, sky and urban. Other classes would receive a class independent (default) enhancement. In particular, images categorized in the class "flowers" are mapped to high saturation and high sharpness modes and are thus given greater correction for saturation and sharpness than an image with an equivalent image quality which is categorized as "interiors" for example. In the case of "urban" images, these are mapped to high sharpness and high local contrast. This provides detail in buildings which may be otherwise hidden by strong shadows.

As will be appreciated, the data for FIG. 4 was obtained in a limited study with a relatively small number of images and participants. More comprehensive studies may yield somewhat different results.

Special Effects

Special effects generally belong to clearly defined classes: blurring, painting/stylization, artificial lighting, the application of color filters to captured images, and the like. In one embodiment, the categorizer is trained to assign images considered to contain special effects to one or more special effects categories $S_{SE}$.

Where special effects are detected in an image, the method may include automatically turning off the enhancement process for those images. Such an automatic subsystem is useful in a printing workflow, where there is a growing number of manipulated photographs, images with unusual viewpoints, lighting, or artificial images generated by professional as well as non-professional photographers. Special effects photographs may be interspersed in the workflow with other images lacking special effects, which may be considered "normal images." It is understood that photographers generally prefer no further changes in their artificially manipulated images.

In the exemplary embodiment, the ICC 20 labels those images categorized as with Special Effects $S_{SE}$. The decision mechanism in the model $F_s$ maps this label to No enhancement. The categorizer 20 may be trained to recognize special effect images, as for any of the other classes used. For example, a bipartite classifier may be trained on two sets of images, one set which is considered by users have special effects and the other set not to contain special effects. Bipartite classifiers which may be used are described in application Ser. No. 11/170,496 to Perronnin, incorporated herein by reference.

Enhancements

As noted above, the model may be configured to determine appropriate modes of aesthetic enhancement dimensions to be performed on an image, based on the image categorization and image quality input to the model. Enhancement algorithms can be global, where the parameters controlling the enhancement approach are the same over the whole image; or local, where the parameters can vary spatially and are generally based on the local characteristics of an image. When all parameters can be set without interaction, based on general considerations or on image content, the enhancement is called automatic. A common technique for enhancing images is through Tone Reproduction Curves (TRCs) which are global mappings of luminance or chrominance channels. The case where the mapping depends on the image region is referred to as Tone Reproduction Operator (TRO). Some enhancements may be manual, requiring user interaction for setting or controlling some of the parameters.

Exemplary enhancement techniques include sharpening, exposure correction, color balance and saturation adjustment, contrast and edge enhancement, blocking artifact reduction and noise reduction. Other enhancements are focused on specific problems, such as red-eye correction, automatic cropping, or glass glare removal.

Sharpness refers to the presence of crisp edges and fine details in an image. Techniques for sharpening often use filters, which may be applied locally or globally, and are described, for example, in Rosenfeld, A. and Kak, A., *Digital Picture Processing* (Academic Press, Inc., New York. 1982); Gonzalez, R. C. and Woods, R., *Digital Image Processing* (Addison-Wesley Pub. Comp, Inc., Reading, Mass. 1992); Fischer, M., Parades, J., and Arce, G., "Weighted Median Image Sharpeners for the World Wide Web," *IEEE Trans. On Image Processing*, 11(7) (2002); Saito, T., Harada, H., Satsumabayashi, J., and Komatsu, T., "Color Image Sharpening Based on Nonlinear Reaction-Diffusion," in *ICIP* (2003); Polesel, A., Ramponi, G., and Mathews, V. J., "Image Enhancement via Adaptive Unsharp masking," *IEEE Trans. On Image Processing*, 9(3) (2000).

Exposure refers to the average of the global distribution of intensity along the dynamic range of the image. Making the image darker or lighter can bring details from the shadows or give depth to the colors of the photograph. The automatic setting of exposure, a feature present in most digital cameras, can yield unrealistic results and exposure correction attempts to overcome this problem. One approach to correcting exposure is to apply gamma correction to the image intensity. For example, the gamma parameter may be determined automatically from the histogram of the input image, as described in Eschbach, R. and Fuss, W., "Automatic Enhancement of Scanned Photographs," in *El Color Imaging: Device Independent Color, Color Hardcopy and Graphic Arts* (1999).

Color balance or white balance is the process of adjusting the colors to resemble perceptual response and is generally a global enhancement. The human visual system ensures the perceived color of objects remains relatively constant under varying illumination and reflectance conditions, e.g., color constancy. When imaging devices are tailored to common illuminants, e.g., D65, they can introduce strong color casts when the scene has another light source. In one approach to color balance, the average chrominance on any given image is assumed to be approximately gray. In another approach, it is assumed that a specular surface on the image will reflect the actual color of the light source. Other closely related approaches which may be employed are white point and black point approaches.

Exemplary techniques for color balance which may be utilized herein, singly or in combination, are described, for example, in Eschbach and Fuss, 1999, discussed above and in U.S. Pat. No. 6,573,932 to Adams, et al., and Barnard, K., Martin, L., Coath, A., and Funt, B., "A Comparison of Computational Color Constancy Algorithms," *IEEE Trans, on Image Processing,* 11(9) (2002).

Saturation refers to the vividness of colored objects in an image. A color with more gray is considered less saturated, while a bright color, one with very little gray in it, is considered highly saturated. The saturation of a color can affect the emotional reaction to an image. Colors that have low saturations are often seen as dull and boring, but can also be thought of as restful and peaceful. Highly saturated colors, on the other hand, are more vibrant and emotionally aggressive. In conventional automatic enhancement approaches, where neither the image content nor the user's intent is known, the system detects and modifies the extremes of color saturation to bring the image saturation to a generally acceptable level. An alternative to the direct modification of the saturation value in HSV space, is to interpolate or extrapolate between the original image and a black-and-white version of the image. Such techniques tend to be rather conservative as user preferences for saturation enhancements often depend on the semantic content of the image. In the exemplary intent-based enhancement system, color saturation enhancement modes are selected by the model with a view to reproducing the user's intent by factoring in the class of the image. Thus, the level of enhancements need not be as conservative, for some of the classes, as conventional techniques.

Exemplary enhancement techniques for reducing saturation which may be utilized herein, singly or in combination, are described, for example, in Haeberli, P. and Voorhies, D., "Image Processing by Linear Interpolation and Extrapolation," *IRIS Universe Magazine, Silicon Graphics,* 28 (1994); and Eschbach, R. and Fuss, W., "Automatic Enhancement of Scanned Photographs," in *El Color Imaging: Device Independent Color, Color Hardcopy and Graphic Arts* (1999).

Contrast refers to the efficient use of the dynamic range. Conventional contrast enhancements aim to make image details more evident to a human observer. In the exemplary intent-based system, this is not necessarily so, depending on the class. Contrast enhancement can be achieved via global approaches or local approaches, e.g., through TROS. Optionally, enhancements may employ generative models to recover the reflectance which may be lost, using edge preserving filters to avoid halo effects.

Exemplary techniques for contrast enhancement which may be used herein singly or in combination are described, for example, in application Ser. Nos. 11/435,588 and 11/435,545, both filed May 17, 2006, entitled HISTOGRAM ADJUSTMENT FOR HIGH DYNAMIC RANGE IMAGE MAPPING, by Jiang Duan, et al.; Tumblin, J. and Rushmeier, H.," Tone Reproduction for Realistic Images," *IEEE Computer Graphics and Applications,* 13(6) (1993); U.S. Pat. No. 5,340,502 to Eschbach, et al.; Zuiderveld, K., "Contrast Limited Adaptive Histogram Equalization, in *Graphic Gems IV* (Press, A. Ed., 1994); Devlin, K., Chalmers, A., Wilkie, A., and Purgathofer, W., "Star: Tone Reproduction and Physically Based Spectral Rendering, in *State of the Art Reports, Eurographics* (2002); DiCarlo, J. and Wandell, B., "Rendering High Dynamic Range Images," in *SPIE: Image Sensors,* volume 3965 (2001); Faftal, R., Lischinski, D., and Werman, M., "Gradient Domain High Dynamic Range Compression," in *ACM Trans, on Graphics* 21, 3 (2002); Ledda, P., Chalmers, A., Troscianko, T., and Seetzen, H., "Evaluation of Tone Mapping Operators Using a High Dynamic Range display," in *Proc. ACM SIG-GRAPH '05* (2005); Chiu, K., Herf, K., Shirley, M., Swamy, P., Wang, S., and Zimmerman, K., "Spatially Nonuniform Scaling Functions for High Contrast Images," in *Proc. Graphics Interface '93* (Kaufmann, M., Ed., 1993); Tumblin, J. and Turk, G., "Lcis: A Boundary Hierarchy for Detail-Preserving Contrast Reduction," in *SIG-GRAPH* (1999); and Durand, F., and Dorsey, J., "Fast Bilateral Filtering for the Display of High Dynamic Range Images," *ACM Trans, on Graphics* 21, 3 (2002).

Blocking artifacts are the result of coding, resizing or compressing the image. One approach to reducing blocking artifacts is to low-pass filter the pixels directly adjacent to the block boundaries. Other techniques, which may be useful in the exemplary system may employ a Gaussian spatial domain filter, linear block boundary filters, anisotropic Gaussian filters perpendicular to the block boundary, edge preserving space-variant region-based filters, wavelet transform to smooth blocking effects while preserving edges, and combinations thereof. Techniques may be employed for estimating the blockiness of an image to adjust the level of correction, and avoid unnecessary degradation.

Exemplary enhancement techniques aimed at blocking artifacts which may be utilized herein singly or in combination are described, for example, in Reeve, H. C. and Lim, J. S., "Reduction of Blocking Effects in Image Coding," *Optical Engineering,* 23(1) (1984); Avril, C. and Nguyen-Trong, T., "Linear Filtering for Reducing Blocking Effects in Orthogonal Transform Image Coding, *J. Electronic Imaging,* 1(2) (1992); Tzou, K. H., "Post-filtering of Transform-coded Images," in *SPIE: Applications of Digital Image Processing XI,* vol. 974 (1988); Ramamurthi, B. and Gersho, A., "Nonlinear Space-variant Post processing of Block Coded Images," *IEEE Trans. Acoust, Speech, Signal Processing,* ASSP-34 (1986); Meier, T., Ngan, K. N., and Crebbin, G., "Reduction of Blocking Artifacts in Image and Video Coding," *IEEE Trans, on Circuits and Systems for Video Technology,* 9(3) (1999); Xiong, Z., Orchard, M. T., and Zhang, Y Q., "A Deblocking Algorithm for jpeg Compressed Images using Overcomplete Wavelet Representations," *IEEE Trans. Circuits and Systems for Video Technology,* 7(4) (1997); Kim, N., Jang, I. H., Kim, D., and Hong, W. H., "Reduction of Blocking Artifact in Block-coded Images Using Wavelet Transform," *IEEE Trans. Circuits and Systems,* 8(3) (1998); Minami, S. and Zakhor, A., "An Optimization Approach for Removing Blocking Effects in Transform Coding, *IEEE Trans. Circuits and Systems for Video Technology,* 5(4) (1995); Tan, K. T. and Ghanbari, M., "Blockiness Detection for mpeg-2-coded Video," *IEEE Signal Processing Letters,* 7 (2000); and Fan, Z. and de Queiroz, R., "Identification of Bitmap Compression History: Jpeg Detection and Quantizer Estimation," *IEEE Trans, on Image Processing,* 12(2) (2003).

Noise can result from imperfect instruments, problems with the data acquisition, transmission and compression, and other sources of noise on the image. Random image noise corresponds generally to visible grain or particles present in the image which are generally caused by the electronic noise in the input device sensor and circuitry (e.g., scanner, digital camera). Intensity spikes speckle or salt and pepper noise will only affect a small number of image pixels. They are caused by flecks of dust on the lens or inside the camera, dust or scratches on scanned photography or film, faulty CCD elements, "hot pixels" occurring with long exposures with digital camera, etc. Banding noise can be introduced when the data is read from the digital sensor (e.g., scanner streaks) and scratches on the film will appear as additional artifacts on the images.

Exemplary enhancements aimed at removal of noise which may be utilized herein may include convolving the original image with a mask (e.g., Gaussian); use of median filters for removing salt and pepper noise while preserving image detail, or use of a wavelet, anisotropic diffusion, or bilateral filtering techniques, and combinations thereof.

Exemplary enhancement techniques for removal of noise which may be utilized herein singly or in combination are described, for example, in Portilla, J., Strela, V., Wainwright, M. J., and Simoncelli, E. P., "Image Denoising using Scale Mixtures of Gaussians in the Wavelet Domain," *IEEE Transactions on Image Processing*, 12(11) (2003); Perona, P. and Malik, J., "Scale-space and Edge Detection using Anisotropic Diffusion," *PAMI*, 12(7) (1990); Tomasi, C. and Manduchi, R., "Bilateral Filtering for Gray and Color Image,". in *ICCV* (1998); and Motwani, M., Gadiya, M., Motwani, R., and Harris, F. C., "A Survey of Image Denoising Techniques," in *Global Signal Processing Expo and Conference* (2004).

Image blur is a form of bandwidth reduction typically caused by relative motion between the camera and the original scene or by an optical system that is out of focus. It can affect the totality or part of an image and many cameras today have built in solutions to stabilize image capture.

Exemplary enhancements aimed at reducing image blur which may be utilized herein include methods for solving the restoration problem from blind de-convolution, approaches that combine power-laws with wavelet domain constraints, methods for removing the specific blur due to camera shake, and combinations thereof. Automatic implementation of such techniques may include the estimation of the level of blur or motion blur for the different image regions, prior to correction.

Exemplary enhancement techniques for reducing blur which may be utilized herein singly or in combination are described, for example, in Zhang, Y., Wen, C., and Zhang, Y., "Estimation of Motion, Parameters from Blurred Images," *Pattern Recognition Letters*, 21 (2000); Stern, A., Kruchakov, I., Yoavi, E., and Kopeika, N., "Recognition of Motion-blurred images by use of the Method of Moments," *Applied Optics*, 41 (2002); Jalobeanu, A., Blanc-Fraud, L., and Zerubia, J., "Estimation of Blur and Noise Parameters in Remote Sensing," in *Int. Conf. on Acoustics, Speech and Signal Processing* (2002); Neelamani, R., Choi, H., and Baraniuk, R., "Forward: Fourier-wavelet Regularized Deconvolution for Ill-conditioned systems," *IEEE Trans, on Signal Processing*, 52 (2004); and Fergus, R., Singh, B., Hertzmann, A., Roweis, S., and Freeman, W. T., "Removing Camera Shake from a Single Image," in *SIGGRAPH* (2006).

As will be appreciated, the model is not limited to the particular enhancements described above. A variety of additional enhancements may be incorporated into the model, including skin dependent exposure correction, skin defect correction, redeye correction, teeth whitening, and the like. See, e.g., U.S. Pat. No. 6,571,003 to Hillebrand, et al., U.S. Pat. No. 6,502,583 to Utsugi, U.S. Patent Application No. 2007/050636 to Simon, et al., U.S. Patent Application No. 2002/0172419 to Lin, et al., Gaubatz, M. and Ulichney, R., "Automatic Red-eye Detection and Correction," in *ICIP* (2002), and Gasparini, F. and Schettini, R., "Automatic Red-eye Removal for Smart Enhancement of Photos of Unknown Origin, in *Int. Conf. on Visual Information Systems* (2005). The model may be configured such that these types of enhancements are applied at a relatively high level to images categorized as faces or people and at a lower level for images categorized as landscapes, for example.

The following relate to sky detection-based image orientation correction: U.S. Pat. No. 6,512,846 to Luo relates to determining orientation of images containing blue sky. Luo, J. and Etz, S., "A Physical Model Based Approach to Detecting Sky in Photographic Images. *IEEE Trans, on Image Processing*, 11(3) (2002) discloses sky-based color enhancements. Zafarifar, B. and de With, P. H. N., "Blue Sky Detection for Picture Quality Enhancement," in *Advanced Concepts for Intelligent Vision Systems* (2006), discloses sky-based enhancements. The model may be configured such that these types of enhancements are applied at a relatively low level to images categorized as faces or people and at a higher level for images categorized as landscapes with sky, for example.

Image categorization and enhancement may be also combined with meta-data information. For example, red eye detection and correction may be applied when meta data indicates the camera flash was triggered at time of capture. Acquiring meta data of this type is described, for example, in U.S. Patent Application No. 2003/0044178 to Oberhardt, et al., which is incorporated herein by reference. In other embodiments, the model may take into account the meta data in determining enhancements. Meta-data may include other information utilized by the model, such as geographic location or web-retrieved information. Availability of meta data of this type is disclosed, for example, in O'Hare, N., Gurrin, C., Lee, H., Murphy, N., Smeaton, A. F., and Jones, G. J., "My Digital Photos: Where and When?" in *Annual ACM Int'l Conf. on Multimedia* (2005).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for image enhancement, comprising:
    with an image processing system, executes instructions for:
    providing for a semantic class to be assigned to a digital image based on image content, the assigned semantic class being selected from a plurality of semantic classes; and
    providing for an aesthetic enhancement to be applied to the image based on an image quality of the image and the assigned semantic class, the enhancement including at least one enhancement dimension selected from a plurality of enhancement dimensions.

2. The method of claim 1, wherein at least one of the enhancement dimensions is associated with a plurality of enhancement modes whereby an enhancement is applied in a selected one of the modes depending on the assigned semantic class.

3. The method of claim 1, wherein the aesthetic enhancement is based on a confidence value representing a confidence with which the semantic class is assigned.

4. The method of claim 1, further comprising computing at least one image quality related parameter for an input digital image and determining the image quality therefrom.

5. The method of claim 1, wherein the semantic class is assigned independently of the image quality.

6. The method of claim 1, wherein the providing for the aesthetic enhancement to be applied comprises:
    determining whether the image could be aesthetically enhanced based on the image quality and, where the determination indicates that the image could be aesthetically enhanced, determining a candidate enhancement including determining at least one enhancement dimension; and
    where the enhancement dimension is applicable in a plurality of enhancement modes, selecting an enhancement mode from the plurality of enhancement modes based on the assigned semantic class and optionally on an assignment confidence value.

7. The method of claim 1, further comprising:
applying the candidate aesthetic enhancement in the selected enhancement mode to the image to generate a modified image.

8. The method of claim 1, further comprising:
rendering the modified image on an output device.

9. The method of claim 1, wherein the image quality includes at least one dimension selected from the group consisting of luminance, chrominance, noise, edge levels, and blocking artifacts.

10. The method of claim 1 wherein the plurality of semantic classes includes at least three semantic classes.

11. The method of claim 1, wherein the plurality of enhancement dimensions comprises at least three enhancement dimensions.

12. The method of claim 2, wherein at least one of the following applies:
a plurality of the enhancement dimensions is each associated with at least two enhancement modes; and
at least one of the enhancement dimensions is associated with at least three enhancement modes.

13. The method of claim 1, wherein the assigning of the semantic class to the image includes categorizing the image with at least one classifier which has been trained on a set of training images, each of the training images having been manually assigned to a class selected from a set of classes.

14. The method of claim 1, wherein the assigning the image to a semantic class includes:
identifying a plurality of patches in the input image;
extracting features from the patches;
assigning at least one visual word to the image based on the extracted features, each visual word being selected from a predefined vocabulary of visual words; and
assigning at least one of the semantic classes to the image based on the assigned at least one visual word; and
optionally, assigning a confidence value to each of the at least one semantic classes based on the assigned visual words.

15. The method of claim 14, wherein the extracting of features from the patches includes computing a features vector for each of the identified patches and the assigning of at least one visual word includes matching the features vector to a visual word in the vocabulary.

16. The method of claim 1, wherein at least one of the enhancement dimensions is selected from the group consisting of sharpening, exposure correction, color balance and saturation adjustment, contrast enhancement, edge enhancement, blocking artifact reduction, noise reduction, and combinations thereof.

17. The method of claim 1, wherein the providing for an aesthetic enhancement to be applied to the image includes inputting the image quality and assigned semantic class into a model which maps image quality dimensions and semantic classes to enhancements.

18. The method of claim 17, wherein in the model, for a first of the enhancement dimensions, the enhancement mode is a default mode for a first of the semantic classes and is a non-default mode for a second of the semantic classes.

19. The method of claim 1, wherein at least one of the plurality of semantic classes is selected from the group consisting of a flower class, an urban class, and a special effects class and, optionally, when one of the classes is a special effects class, no enhancement is made.

20. The method of claim 2, wherein the enhancement modes are selected from a set of discrete enhancement modes in which some of the enhancement modes are default modes and others of the enhancement modes provide for an increased enhancement as compared with the default mode for that enhancement.

21. An image processing system which executes instructions for performing a method for image enhancement, the instructions comprising instructions for:
providing for a semantic class to be assigned to a digital image based on image content, the assigned semantic class being selected from a plurality of semantic classes; and
providing for an aesthetic enhancement to be applied to the image based on an image quality of the image and the assigned semantic class, the enhancement including at least one enhancement dimension selected from a plurality of enhancement dimensions.

22. An image enhancement system comprising:
an image processing component which executes processing instructions stored in memory, the instructions including:
an image quality component for assigning an image quality to the images, based on image quality parameters of input digital images; and
an image categorizing component for assigning a semantic class to an input image based on image content; and
a model which maps assigned image quality and assigned semantic class to candidate aesthetic enhancements, whereby for at least some of the input images, the enhancement is applied in a mode which is dependent on the assigned semantic class.

23. The image enhancement system of claim 22, further comprising:
an image enhancement component which accesses the data structure to determine a candidate enhancement and enhancement mode based on the class and image quality assigned to the image.

24. The image enhancement system of claim 22, wherein the image categorizing component includes at least one classifier which classifies an image based on automatically identified features for each of a plurality of patches of the image.

25. The image enhancement system of claim 22, wherein the image quality component analyses the image quality for assigning the image quality related parameters to the images.

26. A method for forming an image enhancement system, comprising:
identifying a set of candidate aesthetic enhancement dimensions for applying to digital images based on a measure of image quality;
for at least some of the candidate enhancement dimensions, establishing a plurality of discrete modes in which the enhancement dimensions are to be applied;
identifying a set of semantic classes to which digital images are to be assigned by an automated categorizer, based on their image content; and
mapping the semantic classes and image quality measures to discrete modes of the candidate aesthetic enhancement dimensions.

27. The method of claim 26, further comprising:
assigning one of the classes to each of the images in a training set based on image content;
selecting at least one candidate enhancement dimension for each image in the training set;

rendering each of the images in a plurality of enhancement modes for each of the selected candidate enhancement dimensions;

and wherein the mapping is based on user preferences among the rendered images.

28. An image processing system which takes as input a digital image and determines a candidate enhancement for the image based on image quality for the image, the image processing system determining whether the image should be assigned to a special effects class and, where the image is assigned to the special effects class, determines that the candidate enhancement is not to be applied.

* * * * *

UNITED STATES PATENT AND TRADEMARK OFFICE
CERTIFICATE OF CORRECTION

PATENT NO.         : 7,933,454 B2  
APPLICATION NO.    : 11/767739  
DATED              : April 26, 2011  
INVENTOR(S)        : Bressan et al.

Page 1 of 1

It is certified that error appears in the above-identified patent and that said Letters Patent is hereby corrected as shown below:

In the Claims:

Column 20, line 47, in Claim 25 delete "image quality component analyses the image quality" and replace with --image quality component analyzes the image quality--.

Signed and Sealed this  
Fifth Day of April, 2016

Michelle K. Lee  
*Director of the United States Patent and Trademark Office*